(12) United States Patent
Kang et al.

(10) Patent No.: US 9,190,209 B2
(45) Date of Patent: *Nov. 17, 2015

(54) DIELECTRIC CERAMIC COMPOSITION AND MULTILAYER CERAMIC CAPACITOR INCLUDING THE SAME

(71) Applicant: SAMSUNG ELECTRO-MECHANICS CO., LTD., Suwon, Gyunggi-do (KR)

(72) Inventors: Sung Hyung Kang, Gyunggi-do (KR); Du Won Choi, Gyunggi-do (KR); Ki Yong Lee, Gyunggi-do (KR); Jae Hun Choe, Gyunggi-do (KR); Min Sung Song, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 23 days.

This patent is subject to a terminal disclaimer.

(21) Appl. No.: 13/924,411

(22) Filed: Jun. 21, 2013

(65) Prior Publication Data

US 2014/0268484 A1    Sep. 18, 2014

(30) Foreign Application Priority Data

Mar. 14, 2013  (KR) .......................... 10-2013-0027291

(51) Int. Cl.
*H01G 4/12* (2006.01)
*C04B 35/468* (2006.01)
(Continued)

(52) U.S. Cl.
CPC .......... *H01G 4/1227* (2013.01); *C04B 35/4682* (2013.01); *C04B 35/6265* (2013.01);
(Continued)

(58) Field of Classification Search
CPC ........................... C04B 35/4682; H01G 4/1227

USPC ........................................ 501/139; 361/321.4
See application file for complete search history.

(56) References Cited

U.S. PATENT DOCUMENTS 6,310,761 B1    10/2001  Hori et al.
7,336,476 B2 *   2/2008  Kim et al. .................. 361/321.4
(Continued)

FOREIGN PATENT DOCUMENTS

CN        1287366 A     3/2001
JP      2000-173854 A   6/2000
(Continued)

OTHER PUBLICATIONS

Korean Office Action issued in corresponding Korean Application No. 10-2013-0027291, dated Jan. 28, 2014, with English translation.

(Continued)

*Primary Examiner* — Karl Group
(74) *Attorney, Agent, or Firm* — McDermott Will & Emery LLP

(57) ABSTRACT

A dielectric ceramic composition includes: a base material powder $Ba_mTiO_3$ (0.995≤m≤1.010); 0.2 to 2.0 moles of a first accessory ingredient, an oxide or carbide containing at least one of Ba and Ca, based on 100 moles of the base material powder; a second accessory ingredient, an oxide containing Si or a glass compound containing Si; 0.2 to 1.5 moles of a third accessory ingredient, an oxide containing at least one of Sc, Y, La, Ac, Ce, Pr, Nd, Pm, Sm, Eu, Gd, Tb, Dy, Ho, Er, Tm, Yb, and Lu, based on 100 moles of the base material powder; and 0.05 to 0.80 mole of a fourth accessory ingredient, an oxide containing at least one of Cr, Mo, W, Mn, Fe, Co, and Ni, based on 100 moles of the base material powder, a content ratio of the first accessory ingredient to the second accessory ingredient being 0.5 to 1.7.

16 Claims, 1 Drawing Sheet

(51) Int. Cl.
*H01G 4/30* (2006.01)
*C04B 35/626* (2006.01)

(52) U.S. Cl.
CPC ......... *H01G 4/30* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3236* (2013.01); *C04B 2235/3239* (2013.01); *C04B 2235/3241* (2013.01); *C04B 2235/3256* (2013.01); *C04B 2235/3258* (2013.01); *C04B 2235/3262* (2013.01); *C04B 2235/3272* (2013.01); *C04B 2235/3275* (2013.01); *C04B 2235/3279* (2013.01); *C04B 2235/3418* (2013.01); *C04B 2235/36* (2013.01); *C04B 2235/3817* (2013.01); *C04B 2235/5409* (2013.01); *C04B 2235/5445* (2013.01); *C04B 2235/79* (2013.01)

(56) References Cited

U.S. PATENT DOCUMENTS

| | | | |
|---|---|---|---|
| 7,351,676 B2 * | 4/2008 | Koga et al. | 501/137 |
| 7,696,118 B2 * | 4/2010 | Kojima et al. | 501/139 |
| 8,014,126 B2 * | 9/2011 | Sato et al. | 361/321.4 |
| 8,318,624 B2 * | 11/2012 | Muto et al. | 501/139 |
| 8,456,798 B2 * | 6/2013 | Natsui et al. | 361/321.1 |
| 8,593,038 B2 * | 11/2013 | Kang et al. | 310/358 |
| 2002/0098969 A1 | 7/2002 | Nakamura et al. | |
| 2005/0136181 A1 | 6/2005 | Jung et al. | |
| 2006/0240973 A1 | 10/2006 | Koga et al. | |
| 2007/0203016 A1 * | 8/2007 | Kojima et al. | 501/139 |
| 2009/0195960 A1 | 8/2009 | Sato et al. | |
| 2011/0110017 A1 | 5/2011 | Natsui et al. | |
| 2011/0157769 A1 * | 6/2011 | Kang et al. | 361/321.4 |
| 2012/0113562 A1 * | 5/2012 | Kang et al. | 361/321.2 |
| 2013/0162100 A1 * | 6/2013 | Kang et al. | 310/311 |

FOREIGN PATENT DOCUMENTS

| | | | |
|---|---|---|---|
| JP | 2002-308671 A | | 10/2002 |
| JP | 2009120466 | * | 6/2009 |
| JP | 2012-036080 A | | 2/2012 |
| KR | 2002-0040610 A | | 5/2002 |
| KR | 10-2005-0063466 A | | 6/2005 |
| KR | 2008-0022578 A | | 3/2008 |
| KR | 2011-0050391 A | | 5/2011 |
| WO | 2005-016845 A1 | | 2/2005 |

OTHER PUBLICATIONS

Japanese Office Action dated Oct. 14, 2014, issued in corresponding Japanese Patent Application No. 2013-107818, with English translation.

Chinese First Notification of Office Action issued in corresponding Chinese Patent Application No. 201310218310.6, mailed on Apr. 16, 2015, 15 pages with English translation.

Korean Notice of Office Action issued in corresponding Korean Patent Application No. 10-2014-0155841, mailed on Aug. 17, 2015; 6 pages with English translation.

* cited by examiner

A-A'

DIELECTRIC CERAMIC COMPOSITION AND MULTILAYER CERAMIC CAPACITOR INCLUDING THE SAME

CROSS-REFERENCE TO RELATED APPLICATIONS

This application claims the priority of Korean Patent Application No. 10-2013-0027291 filed on Mar. 14, 2013, in the Korean Intellectual Property Office, the disclosure of which is incorporated herein by reference.

BACKGROUND OF THE INVENTION

1. Field of the Invention

The present invention relates to a dielectric ceramic composition and a multilayer ceramic capacitor including the same, and more particularly, to a dielectric ceramic composition having a high dielectric constant and excellent high-temperature reliability, and a multilayer ceramic capacitor including the same.

2. Description of the Related Art

In general, electronic components using a ceramic material, such as a capacitor, an inductor, a piezoelectric element, a varistor, a thermistor, or the like, include a ceramic body formed of a ceramic material, internal electrodes formed within the ceramic body, and external electrodes provided on surfaces of the ceramic body and connected to respective internal electrodes.

Among ceramic electronic components, multilayer ceramic capacitors include a plurality of stacked dielectric layers, internal electrodes disposed to face each other, having the dielectric layer interposed therebetween, and external electrodes electrically connected to respective internal electrodes.

Multilayer ceramic capacitors have been widely used as components in mobile communications devices such as computers, personal data assistants (PDAs), mobile phones, and the like, due to advantages thereof such as a relatively small size, high capacitance, ease of mounting, and the like.

A multilayer ceramic capacitor is manufactured by using a paste for internal electrodes and a paste for dielectric layers in a sheet method, a printing method, or the like, and simultaneously sintering the stacked sheets of paste.

However, in the case of a dielectric material used in the multilayer ceramic capacitor according to the related art, or the like, when the dielectric material is sintered under a reducing atmosphere, the dielectric material may be reduced to thereby become a semiconductor.

For this reason, as a material for internal electrodes, a noble metal such as palladium (Pd), or the like, which may not be melted at a temperature at which the dielectric material is sintered and may not be oxidized even in the case of being sintered at a high oxygen partial pressure at which the dielectric material does not become a semiconductor, is used.

However, since a noble metal such as palladium (Pd) or the like, is relatively expensive, the noble metal may significantly increase manufacturing costs of the multilayer ceramic capacitor.

Therefore, as the material for internal electrodes, a base metal such as nickel (Ni), a nickel alloy, or the like, which is relatively inexpensive, is mainly used.

However, in the case in which the base metal is used as a conductive material in the internal electrodes, the internal electrodes may be oxidized in the case of sintering the internal electrodes under an air atmosphere.

Therefore, the dielectric layers and the internal electrodes should be simultaneously sintered under the reducing atmosphere.

However, when they are sintered under the reducing atmosphere, the dielectric layer may be reduced, such that insulation resistance (IR) may be decreased.

Therefore, a non-reducing dielectric material has been suggested.

Further, in the case in which barium titanate ($BaTiO_3$) is used as a base material for the dielectric material, in order to suppress non-uniform grain growth and form uniform grains, a magnesium oxide (MgO) additive has generally been used.

However, the magnesium oxide (MgO) additive may be easily solid-solubilized in barium titanate ($BaTiO_3$) to serve as an acceptor, such that there is a problem in terms of high-temperature reliability. Therefore, a solution for the problem has been required.

[RELATED ART DOCUMENT]
(Patent Document 1) Korean Patent Laid-Open Publication No. 2002-0040610

SUMMARY OF THE INVENTION

An aspect of the present invention provides a dielectric ceramic composition having a high dielectric constant and excellent high-temperature reliability, and a multilayer ceramic capacitor including the same.

According to an aspect of the present invention, there is provided a dielectric ceramic composition including: a base material powder represented by $Ba_mTiO_3$ ($0.995 \leq m \leq 1.010$); 0.2 to 2.0 moles of a first accessory ingredient, an oxide or a carbide containing at least one of Ba and Ca, based on 100 moles of the base material powder; a second accessory ingredient, an oxide containing Si or a glass compound containing Si; 0.2 to 1.5 moles of a third accessory ingredient, an oxide containing at least one of Sc, Y, La, Ac, Ce, Pr, Nd, Pm, Sm, Eu, Gd, Tb, Dy, Ho, Er, Tm, Yb, and Lu, based on 100 moles of the base material powder; and 0.05 to 0.80 mole of a fourth accessory ingredient, an oxide containing at least one of Cr, Mo, W, Mn, Fe, Co, and Ni, based on 100 moles of the base material powder, wherein a content ratio of the first accessory ingredient to the second accessory ingredient is 0.5 to 1.7.

In the base material powder represented by $Ba_mTiO_3$, m may satisfy the following Equation: $0.995 \leq m \leq 0.998$.

The base material powder may have a specific surface area of $5.0 m^2/g$ or less.

A content of the first accessory ingredient may be 0.5 to 1.5 moles.

The content ratio of the first accessory ingredient to the second accessory ingredient may be 0.7 to 1.2.

A content of the third accessory ingredient may be 0.5 to 1.0 mole.

A content of the fourth accessory ingredient may be 0.1 to 0.4 mole.

The dielectric ceramic composition may further include 0.05 to 0.3 mole of vanadium (V) oxide, based on 100 moles of the base material powder.

The dielectric ceramic composition may further include 0.05 to 0.5 mole of aluminum (Al) oxide, based on 100 moles of the base material powder.

According to another aspect of the present invention, there is provided a multilayer ceramic capacitor including: a ceramic body in which dielectric layers and first and second internal electrodes are alternately stacked; and first and second external electrodes formed on both ends of the ceramic body and electrically connected to the first and second internal electrodes, wherein the dielectric layer includes a ceramic composition including a base material powder represented by $Ba_mTiO_3$ (0.995≤m≤1.010), 0.2 to 2.0 moles of a first accessory ingredient, an oxide or a carbide containing at least one of Ba and Ca, based on 100 moles of the base material powder, a second accessory ingredient, an oxide containing Si or a glass compound containing Si, 0.2 to 1.5 moles of a third accessory ingredient, an oxide containing at least one of Sc, Y, La, Ac, Ce, Pr, Nd, Pm, Sm, Eu, Gd, Tb, Dy, Ho, Er, Tm, Yb, and Lu, based on 100 moles of the base material powder, and 0.05 to 0.80 mole of a fourth accessory ingredient, an oxide containing at least one of Cr, Mo, W, Mn, Fe, Co, and Ni, based on 100 moles of the base material powder, a content ratio of the first accessory ingredient to the second accessory ingredient being 0.5 to 1.7.

In the base material powder represented by $Ba_mTiO_3$, m may satisfy the following Equation: 0.995≤m≤0.998.

The base material powder may have a specific surface area of $5.0 m^2/g$ or less.

A content of the first accessory ingredient may be 0.5 to 1.5 moles.

The content ratio of the first accessory ingredient to the second accessory ingredient may be 0.7 to 1.2.

A content of the third accessory ingredient may be 0.5 to 1.0 mole.

A content of the fourth accessory ingredient may be 0.1 to 0.4 mole.

The ceramic composition may further include 0.05 to 0.3 mole of vanadium (V) oxide, based on 100 moles of the base material powder.

The ceramic composition may further include 0.05 to 0.5 mole of aluminum (Al) oxide, based on 100 moles of the base material powder.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The present invention relates to a dielectric ceramic composition. Examples of an electronic component including the dielectric ceramic composition include a capacitor, an inductor, a piezoelectric element, a varistor, a thermistor, or the like. Hereinafter, as an example of the electronic component, a multilayer ceramic capacitor will be described.

Figure 1:
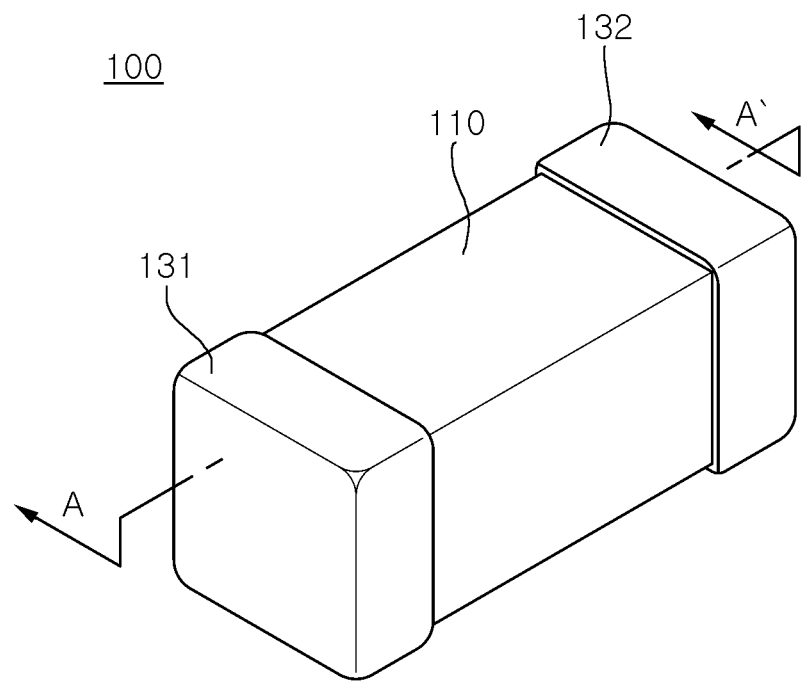
FIG. 1 is a schematic perspective view of a multilayer ceramic capacitor according to an embodiment of the present invention.
Figure 2:
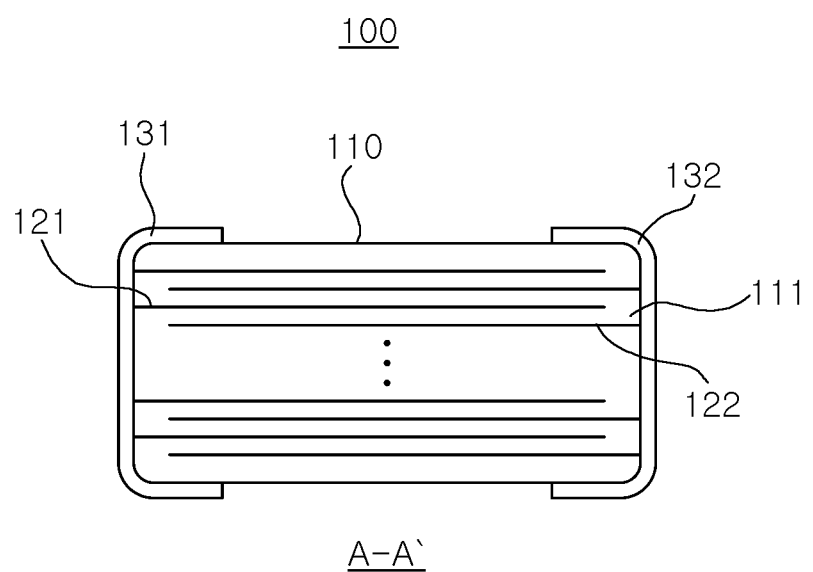
FIG. 2 is a schematic cross-sectional view of the multilayer ceramic capacitor taken along line A-A' of FIG. 1.

FIG. 1 is a schematic perspective view of a multilayer ceramic capacitor according to an embodiment of the present invention, while FIG. 2 is a schematic cross-sectional view of the multilayer ceramic capacitor taken along line A-A' of FIG. 1.

Referring to FIGS. 1 and 2, a multilayer ceramic capacitor 100 according to the present embodiment of the invention may include a ceramic body 110 in which dielectric layers 111 and first and second internal electrodes 121 and 122 are alternately stacked. Both ends of the ceramic body 110 are provided with first and second external electrodes 131 and 132 electrically connected to the first and second internal electrodes 121 and 122 that are alternately disposed within the ceramic body 110.

A shape of the ceramic body 110 is not particularly limited, but the ceramic body 110 may generally have a rectangular parallelepiped shape. In addition, dimensions of the ceramic body are not particularly limited, and the ceramic body may have appropriate dimensions according to the intended use thereof. For example, the ceramic body may have dimensions of (0.6~5.6mm)×(0.3~5.0mm)×(0.3~1.9mm).

A thickness of the dielectric layer 111 may be optionally changed according to a desired amount of capacitance to be implemented in the capacitor. According to the embodiment of the invention, a thickness of a single dielectric layer may be 0.2µm or more after sintering.

In the case in which the dielectric layer is excessively thin, since the number of grains existing in the single dielectric layer is relatively small, leading to a negative influence on reliability, the thickness of the dielectric layer may be 0.2µm or more.

The first and second internal electrodes 121 and 122 are stacked such that end surfaces thereof are alternately exposed to both end surfaces of the ceramic body 110 opposing each other, respectively.

The first and second external electrodes 131 and 132 are formed on both ends of the ceramic body 110 and electrically connected to the exposed ends of the first and second internal electrodes 121 and 122 that alternate with each other, thereby configuring a capacitor circuit.

A conductive material contained in the first and second internal electrodes 121 and 122 is not particularly limited, but a base metal may be used since a material configuring the dielectric layer according to the embodiment of the invention has resistance to reduction.

As the base metal used as the conductive material, there is provided nickel (Ni) or a nickel (Ni) alloy.

An example of the nickel (Ni) alloy may be an alloy of nickel (Ni) and at least one element selected from manganese (Mn), chromium (Cr), cobalt (Co), and aluminum (Al), wherein a content of nickel (Ni) in the alloy may be 95 weight % or more.

A thickness of the first and second internal electrodes 121 and 122 may be appropriately determined according to the intended use thereof, or the like, but is not particularly limited. For example, the thickness of the internal electrode may be 0.1 to 5µm, or 0.1 to 2.5µm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined according to the intended use thereof, or the like, but is not particularly limited. For example, the thickness of the external electrode may be 10 to 50μm.

The dielectric layer 111 configuring the ceramic body 110 may contain a dielectric ceramic composition according to the embodiment of the invention.

The dielectric ceramic composition according to the embodiment of the invention may contain a base material powder represented by $Ba_mTiO_3$ ($0.995 \le m \le 1.010$) and first to fourth accessory ingredients.

Since the dielectric ceramic composition according to the embodiment of the invention may have a high dielectric constant and high-temperature reliability and may be sintered at a low temperature under a reducing atmosphere, even in the case in which nickel (Ni) internal electrodes are used, an ultra high capacitance product having excellent reliability may be implemented.

In addition, even though magnesium (Mg) is not used as an additive in the dielectric ceramic composition according to the embodiment of the invention, the dielectric ceramic composition may have excellent high-temperature reliability and economical efficiency.

Hereinafter, each ingredient of the dielectric ceramic composition according to the embodiment of the invention will be described in detail.

a) Base Material Powder

The dielectric ceramic composition according to the embodiment of the invention may contain a base material powder represented by $Ba_mTiO_3$ ($0.995 \le m \le 1.010$).

In the above equation, when m is less than 0.995, the dielectric ceramic material may be easily reduced at the time of sintering under the reducing atmosphere to thereby be changed into a semiconducting material, and it may be difficult to control grain growth.

Meanwhile, when m is greater than 1.010, a sintering temperature may be increased, and desired temperature characteristics may not be obtained.

According to the embodiment of the invention, in the base material powder represented by $Ba_mTiO_3$, m may satisfy the following Equation: $0.995 \le m \le 0.998$.

When m is controlled to be in a range of 0.995 to 0.998 ($0.995 \le m \le 0.998$), the sintering operation can be performed at a low temperature under the reducing atmosphere, and desired temperature characteristics may be obtained. Particularly, a decrease in capacitance due to high-temperature degradation may not be generated, such that a high capacitance product may be implemented.

In the case in which m is greater than 0.998, a decrease in capacitance due to the high-temperature degradation may be generated.

Further, the base material powder is not particularly limited, but may have an average grain size of 200nm or less.

In addition, a specific surface area of the base material powder is not particularly limited, but may be, for example, $5.0m^2/g$ or less.

b) First Accessory Ingredient

According to the embodiment of the invention, the dielectric ceramic composition may contain an oxide or a carbide including at least one of Ba and Ca, as the first accessory ingredient.

The first accessory ingredient may serve to impart resistance to reduction, grain growth control, and sintering stability to the dielectric ceramic composition.

Generally, for the grain growth control of the dielectric ceramic composition, that is, for suppressing non-uniform grain growth and forming uniform grains, an oxide containing Mg has been used as an additive.

However, the magnesium containing oxide (MgO) additive may be easily solid-solubilized in barium titanate ($BaTiO_3$) to serve as an acceptor, such that there is a problem in terms of high-temperature reliability.

Since the dielectric ceramic composition according to the embodiment of the invention does not contain magnesium containing oxide (MgO) as the additive, the dielectric ceramic composition may have excellent high-temperature reliability and economical efficiency.

A content of the first accessory ingredient may be 0.2 to 2 moles, based on 100 moles of the base material powder.

The content of the first accessory ingredient and contents of the second to fourth accessory ingredients, which are based on 100 moles of the base material powder, may be particularly defined as mole numbers of metal ions contained in each of the accessory ingredients.

In the case in which the content of the first accessory ingredient is less than 0.2 mole, the dielectric ceramic composition may be easily reduced at the time of sintering under the reducing atmosphere, such that it may be difficult to control the grain growth, and in the case in which the content of the first accessory ingredient is greater than 2 moles, the sintering temperature may be increased, and it may be difficult to obtain a high dielectric constant to be desired.

Particularly, the dielectric ceramic composition according to the embodiment of the invention may contain 0.5 to 1.5 moles of the first accessory ingredient, such that the grain growth may be more easily controlled, and a high dielectric constant may be obtained.

c) Second Accessory Ingredient

According to the embodiment of the invention, the dielectric ceramic composition may contain an oxide containing Si or a glass compound containing Si as the second accessory ingredient.

The second accessory ingredient may react with other ingredients, particularly, the first accessory ingredient or the base material powder to impart sintering properties.

A content ratio of the first accessory ingredient to the second accessory ingredient is not particularly limited, but, for example, may be 0.5 to 1.7.

In the case in which the content ratio of the first accessory ingredient to the second accessory ingredient is less than 0.5, there may be a problem in terms of high-temperature accelerated life characteristics, such that reliability may be deteriorated, and the desired temperature characteristics, particularly, temperature coefficient of capacitance (TCC) characteristics may not be implemented.

In the case in which the content ratio of the first accessory ingredient to the second accessory ingredient is greater than 1.7, the sintering temperature may be increased, the desired dielectric constant may not be obtained, and dielectric characteristics may be deteriorated.

Particularly, according to the embodiment of the invention, the content ratio of the first accessory ingredient to the second accessory ingredient may be in a range of 0.7 to 1.2, such that a multilayer ceramic capacitor having a low sintering temperature, excellent dielectric characteristics, and excellent reliability may be implemented.

d) Third Accessory Ingredient

According to the embodiment of the invention, the dielectric ceramic composition may contain an oxide containing at least one of Sc, Y, La, Ac, Ce, Pr, Nd, Pm, Sm, Eu, Gd, Tb, Dy, Ho, Er, Tm, Yb, and Lu as the third accessory ingredient.

The third accessory ingredient may serve to improve high-temperature accelerated lifetime and stabilize a capacitance change occurring at a Curie temperature (Tc) or higher, thereby allowing the desired temperature characteristics to be satisfied.

A content of the third accessory ingredient may be 0.2 to 1.5 moles, based on 100 moles of the base material powder.

In the case in which the content of the third accessory ingredient is less than 0.2 mole, the sintering temperature may be increased, the high-temperature accelerated lifetime may be decreased, and the temperature coefficient of capacitance (TCC) may be unstable.

In the case in which the content of the third accessory ingredient is greater than 1.5 moles, the sintering temperature may be increased, it may be difficult to obtain a desired dielectric constant, and reliability may be deteriorated due to the generation of a secondary phase.

Particularly, the dielectric ceramic composition according to the embodiment of the invention may contain 0.5 to 1.0 mole of the third accessory ingredient, such that the temperature coefficient of capacitance (TCC) characteristics may be excellent, and a high dielectric constant may be obtained.

e) Fourth Accessory Ingredient

According to the embodiment of the invention, the dielectric ceramic composition may contain an oxide containing at least one of Cr, Mo, W, Mn, Fe, Co, and Ni as the fourth accessory ingredient.

The fourth accessory ingredient may serve to increase insulation resistance (IR) and improve high-temperature accelerated lifetime.

A content of the fourth accessory ingredient may be 0.05 to 0.80 mole, based on 100 moles of the base material powder.

In the case in which the content of the fourth accessory ingredient is less than 0.05 mole, room-temperature insulation resistance (IR) characteristics may be deteriorated, and high-temperature accelerated lifetime may be decreased.

In the case in which the content of the fourth accessory ingredient is greater than 0.80 mole, a C*R (capacitance*resistance) value may be decreased, and capacitance change according to time may be increased.

Particularly, the dielectric ceramic composition according to the embodiment of the invention may contain 0.1 to 0.4 mole of the fourth accessory ingredient, such that the room-temperature insulation resistance (IR) characteristics may be excellent, and a high C*R (capacitance*resistance) value may be obtained.

f) Other Accessory Ingredients

The dielectric ceramic composition according to the embodiment of the invention may further contain an oxide containing vanadium (V).

This accessory ingredient may serve to decrease the sintering temperature, improve high-temperature accelerated lifetime, and stabilize a capacitance change at a Curie temperature (Tc) or higher.

A content of the oxide containing vanadium (V) may be 0.05 to 0.30 mole, based on 100 moles of the base material powder.

When the content of the oxide containing vanadium (V) is less than 0.05 mole, the high-temperature accelerated lifetime is decreased, and when the content of the oxide containing vanadium (V) is greater than 0.30 mole, the C*R (capacitance*resistance) value may be decreased.

In addition, the dielectric ceramic composition according to the embodiment of the invention may further contain an oxide containing aluminum (Al).

This accessory ingredient may react with the other ingredients, particularly, the first accessory ingredient or the base material powder to impart sintering properties.

A content of the oxide containing aluminum (Al) may be 0.05 to 0.5 mole, based on 100 moles of the base material powder.

In the case in which the content of the oxide containing aluminum (Al) is less than 0.05 mole, the sintering temperature may be increased, and in the case in which the content is greater than 0.5 mole, it may be difficult to control grain growth, and the temperature coefficient of capacitance (TCC) characteristics may be deteriorated.

Hereinafter, Inventive and Comparative Examples will be described in detail, but they are merely provided to help in understanding of the present invention. Therefore, the scope of the invention is not limited to Examples.

Raw material powders having the compositions and contents shown in Table 1 were mixed with ethanol/toluene, a dispersing agent, and a binder using zirconia balls as mixing/dispersing media and then ball-milled for 20 hours, thereby preparing a slurry.

The prepared slurry was formed as a sheet having a thickness of about 1.0 to 2.0μm using a coater in a small doctor blade scheme.

A nickel (Ni) internal electrode having a thickness of about 2.0μm was printed on the sheet.

As upper and lower cover layers, sheets having a thickness of 10 to 13μm were stacked in an amount of 25 layers, and the sheets on which the internal electrodes having a thickness of about 2.0μm were printed were stacked to form an active layer, thereby manufacturing a bar.

The compressed bar was cut into chips having a 1005-standard size using a cutter.

After the manufactured chips were calcined and then sintered at a temperature of 1100 to 1200° C. under a reducing atmosphere (0.08% $H_2$) for 2 hours, the chips were heat-treated at 1000° C. for 3 hours for re-oxidation (20ppm $O_2$). The sintered chips were subjected to a termination process and then released for 24 hours, followed by measurement.

In the following Table 1, the content of each of the accessory ingredients is indicated as a mole number per 100 moles of the base material, and a dielectric constant is calculated based on a capacitance value measured under conditions of 0.5V/μm and 1kHz.

In addition, temperature coefficient of capacitance (TCC) may refer to a change rate in a capacitance value at 85° C., based on a capacitance value at 25° C. and refer to a value measured under the conditions of 0.5V/μm and 1kHz.

Further, high-temperature reliability was evaluated as follows. Among 20 samples, a case in which a defect was not generated under conditions of 130° C., 4 hours, and 10V/μm (based on a thickness after sintering) is represented as "○", and a case in which a defect was generated is represented as "x"

TABLE 1

| | m | First Accessory Ingredient (mole) | Third Accessory Ingredient (mole) | Fourth Accessory Ingredient (mole) | Other Ingredient (mole) | First Accessory Ingredient Content/Second Accessory Ingredient Content | Dielectric Constant | TCC (%) (at 85° C.) | Evaluation of High-Temperature Reliability |
|---|---|---|---|---|---|---|---|---|---|
| 1 | 1.000 | Ba 0.8 Ca 0.2 | Y 0.2 Ho 0.0 Dy 0.0 | Mn 0.2 Cr 0.1 Mo 0.0 | — | 0.7 | 4000 | −10% | ○ |
| 2 | 0.995 | Ba 1.8 Ca 0.0 | Y 0.1 Yb 0.1 Dy 0.1 | Mn 0.1 Cr 0.2 Mo 0.0 | — | 0.5 | 4600 | −13% | ○ |
| 3 | 1.010 | Ba 0.4 Ca 0.0 | Y 0.1 Yb 0.0 Dy 0.6 | Mn 0.05 Cr 0.0 Mo 0.0 | — | 0.6 | 3900 | −13% | ○ |
| *4 | 0.993 | Ba 0.0 Ca 2.0 | Y 0.0 Yb 0.0 Dy 1.5 | Mn 0.1 Cr 0.0 Mo 0.1 | — | 0.6 | 3000 | −6% | x |
| *5 | 0.995 | Ba 1.0 Ca 1.0 | Y 0.0 Yb 0.0 Dy 2.0 | Mn 0.3 Cr 0.0 Mo 0.0 | — | 0.8 | 2600 | −8% | ○ |
| *6 | 1.003 | Ba 0.1 Ca 0.0 | Y 0.0 Ho 1.1 Dy 1.6 | Mn 0.5 Cr 0.1 Mo 0.0 | — | 1.7 | 2700 | −17% | x |
| 7 | 0.998 | Ba 0.4 Ca 0.5 | Y 1.0 Ho 0.0 Dy 0.0 | Mn 0.4 Cr 0.4 Mo 0.0 | — | 1.0 | 3700 | −10% | ○ |
| *8 | 0.998 | Ba 0.5 Ca 1.2 | Y 0.9 Ho 0.0 Dy 2.1 | Mn 0.8 Cr 0.2 Mo 0.0 | — | 0.9 | 2300 | −5% | ○ |
| 9 | 1.003 | Ba 0.4 Ca 0.5 | Y 0.0 Ho 0.0 Dy 0.9 | Mn 0.1 Cr 0.1 Mo 0.0 | V 0.3 | 1.0 | 4300 | −10% | ○ |
| 10 | 0.998 | Ba 0.4 Ca 0.5 | Y 0.0 Ho 0.0 Dy 0.9 | Mn 0.1 Cr 0.1 Mo 0.0 | Al 0.5 | 1.0 | 4600 | −12% | ○ |
| 11 | 0.995 | Ba 0.4 Ca 0.5 | Y 0.0 Ho 0.0 Dy 0.9 | Mn 0.1 Cr 0.1 Mo 0.0 | V 0.3 Al 0.5 | 0.8 | 4600 | −13% | ○ |
| *12 | 1.015 | Ba 0.4 Ca 0.0 | Y 0.6 Ho 0.4 Dy 0.0 | Mn 0.2 Cr 0.0 Mo 0.0 | V 0.15 Al 0.3 | 0.5 | 3500 | −13% | x |
| 13 | 0.995 | Ba 1.0 Ca 0.5 | Y 0.0 Ho 0.0 Dy 0.7 | Mn 0.1 Cr 0.0 Mo 0.0 | V 0.2 Al 0.2 | 1.7 | 4500 | −14% | ○ |

*Comparative Examples

Referring to Table 1, it may be appreciated that in the case of samples 1 to 3, 7, 9 to 11, and 13 in which an m value of the base material powder and contents of the first to fourth accessory ingredients and other ingredients satisfied the numerical ranges of the present invention, dielectric constants, temperature coefficients of capacitance (TCC), and high-temperature reliability were excellent.

On the other hand, it may be appreciated that in the case of samples 4 and 12 corresponding to Comparative Examples, the m value of the base material powder was outside of the numerical range of the present invention, and thus, there was a problem in terms of high-temperature reliability.

Further, it may be appreciated that in the case of sample 5 corresponding to Comparative Example, the content of the third accessory ingredient was outside of the numerical range of the present invention, and thus, the dielectric constant was decreased.

It may be appreciated that in the case of sample 6 corresponding to Comparative Example, the contents of the first and third accessory ingredients were outside of the numerical ranges of the present invention, and thus, the dielectric constant was decreased, and there were problems in terms of temperature coefficient of capacitance (TCC) and high-temperature reliability.

It may be appreciated that in the case of sample 8 corresponding to Comparative Example, the contents of the third and fourth accessory ingredients were outside of the numerical ranges of the present invention, and thus, the dielectric constant was decreased.

As set forth above, the dielectric ceramic composition according to embodiments of the invention may secure a high dielectric constant and high-temperature reliability and may be sintered at a low temperature under a reducing atmosphere, such that nickel (Ni) internal electrodes may be used therein.

In addition, even though magnesium (Mg) is not used as an additive in the dielectric ceramic composition according to the embodiments of the invention, the dielectric ceramic composition may have excellent high-temperature reliability and economical efficiency.

While the present invention has been shown and described in connection with the embodiments, it will be apparent to those skilled in the art that modifications and variations can be made without departing from the spirit and scope of the invention as defined by the appended claims.

What is claimed is:

1. A dielectric ceramic composition comprising:
   a base material powder represented by $Ba_mTiO_3$ ($0.995 \leq m \leq 0.998$);
   0.2 to 2.0 moles of a first accessory ingredient, an oxide or a carbide containing at least one of Ba and Ca, based on 100 moles of the base material powder;
   a second accessory ingredient, an oxide containing Si or a glass compound containing Si;
   0.2 to 1.5 moles of a third accessory ingredient, an oxide containing at least one of Sc, Y, La, Ac, Ce, Pr, Nd, Pm, Sm, Eu, Gd, Tb, Dy, Ho, Er, Tm, Yb, and Lu, based on 100 moles of the base material powder; and
   0.05 to 0.80 mole of a fourth accessory ingredient, an oxide containing at least one of Cr, Mo, W, Mn, Fe, Co, and Ni, based on 100 moles of the base material powder,
   wherein a content ratio of the first accessory ingredient to the second accessory ingredient is 0.5 to 1.7, and
   wherein the dielectric ceramic composition does not include an oxide containing magnesium.

2. The dielectric ceramic composition of claim 1, wherein the base material powder has a specific surface area of $5.0 m^2/g$ or less.

3. The dielectric ceramic composition of claim 1, wherein a content of the first accessory ingredient is 0.5 to 1.5 moles.

4. The dielectric ceramic composition of claim 1, wherein the content ratio of the first accessory ingredient to the second accessory ingredient is 0.7 to 1.2.

5. The dielectric ceramic composition of claim 1, wherein a content of the third accessory ingredient is 0.5 to 1.0 mole.

6. The dielectric ceramic composition of claim 1, wherein a content of the fourth accessory ingredient is 0.1 to 0.4 mole.

7. The dielectric ceramic composition of claim 1, further comprising 0.05 to 0.3 mole of vanadium (V) oxide, based on 100 moles of the base material powder.

8. The dielectric ceramic composition of claim 1, further comprising 0.05 to 0.5 mole of aluminum (Al) oxide, based on 100 moles of the base material powder.

9. A multilayer ceramic capacitor comprising:
   a ceramic body in which dielectric layers formed of a dielectric ceramic composition and first and second internal electrodes are alternately stacked; and
   first and second external electrodes formed on both ends of the ceramic body and electrically connected to the first and second internal electrodes,
   wherein the dielectric ceramic composition includes a ceramic composition including a base material powder represented by $Ba_mTiO_3$ ($0.995 \leq m \leq 0.998$), 0.2 to 2.0 moles of a first accessory ingredient, an oxide or a carbide containing at least one of Ba and Ca, based on 100 moles of the base material powder, a second accessory ingredient, an oxide containing Si or a glass compound containing Si, 0.2 to 1.5 moles of a third accessory ingredient, an oxide containing at least one of Sc, Y, La, Ac, Ce, Pr, Nd, Pm, Sm, Eu, Gd, Tb, Dy, Ho, Er, Tm, Yb, and Lu, based on 100 moles of the base material powder, and 0.05 to 0.80 mole of a fourth accessory ingredient, an oxide containing at least one of Cr, Mo, W, Mn, Fe, Co, and Ni, based on 100 moles of the base material powder, a content ratio of the first accessory ingredient to the second accessory ingredient being 0.5 to 1.7, and
   wherein the dielectric ceramic composition does not include an oxide containing magnesium.

10. The multilayer ceramic capacitor of claim 9, wherein the base material powder has a specific surface area of $5.0 m^2/g$ or less.

11. The multilayer ceramic capacitor of claim 9, wherein a content of the first accessory ingredient is 0.5 to 1.5 moles.

12. The multilayer ceramic capacitor of claim 9, wherein the content ratio of the first accessory ingredient to the second accessory ingredient is 0.7 to 1.2.

13. The multilayer ceramic capacitor of claim 9, wherein a content of the third accessory ingredient is 0.5 to 1.0 mole.

14. The multilayer ceramic capacitor of claim 9, wherein a content of the fourth accessory ingredient is 0.1 to 0.4 mole.

15. The multilayer ceramic capacitor of claim 9, wherein the ceramic composition further includes 0.05 to 0.3 mole of vanadium (V) oxide, based on 100 moles of the base material powder.

16. The multilayer ceramic capacitor of claim 9, wherein the ceramic composition further includes 0.05 to 0.5 mole of aluminum (Al) oxide, based on 100 moles of the base material powder.

* * * * *